United States Patent Office 2,800,757
Patented July 30, 1957

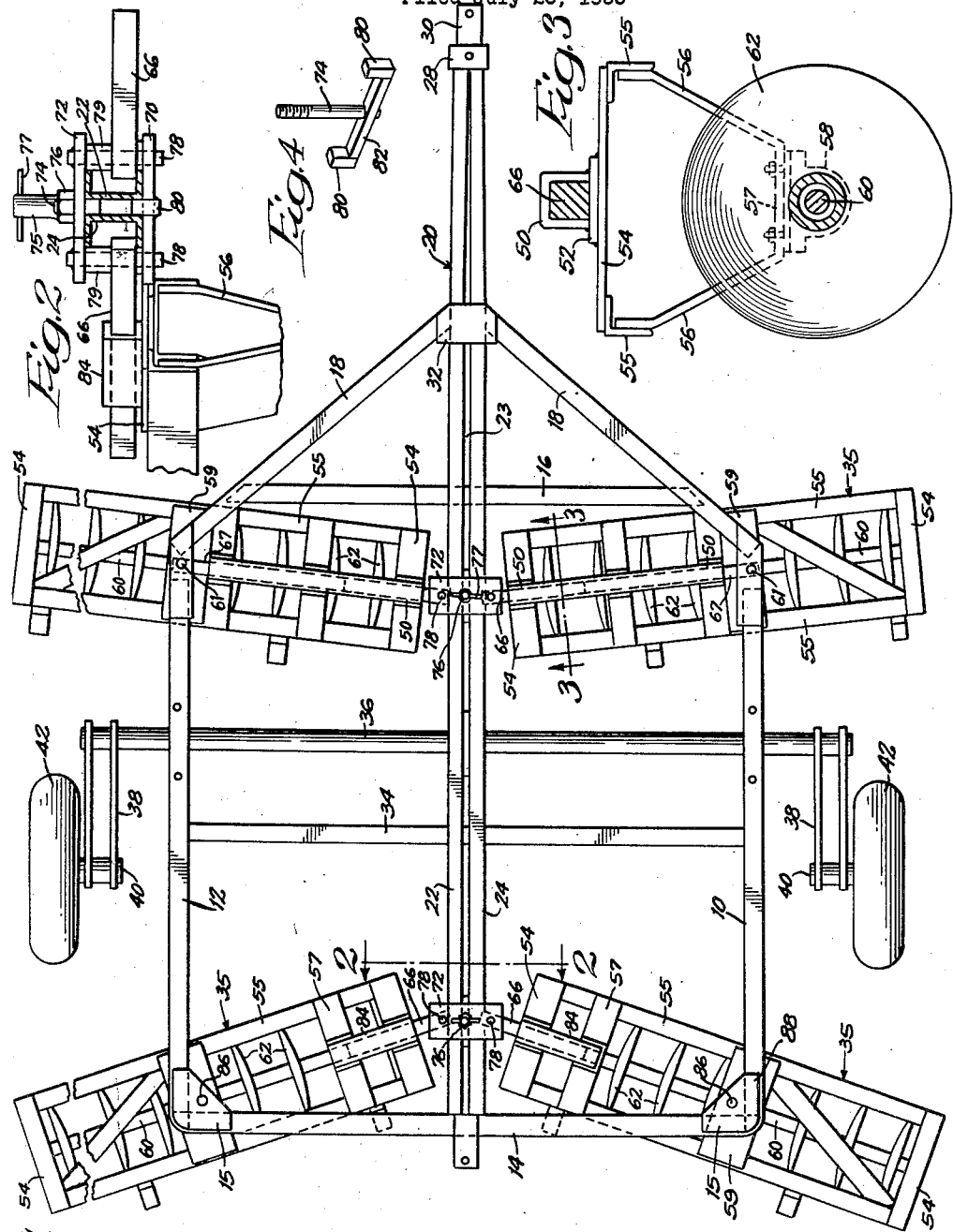

2,800,757
TANDEM DISC HARROW

Robert D. Tufford, Minneapolis, Minn., assignor to Winpower Manufacturing Co., Newton, Iowa, a corporation of Iowa Application July 25, 1955, Serial No. 524,245

1 Claim. (Cl. 55—83)

This invention relates to a tandem disc harrow or similar tillage implement adapted to be drawn by a tractor, and more particularly to the improved means for securing the tillage gangs to the frame of the implement.

One object of the invention is to provide means for securing the tillage gangs in tandem at any desired angle with a line extending transversely of the frame.

Another object is to provide simple means for quickly adjusting the angle of the gangs and for removing and replacing them with another type of tillage tool.

Another object is to provide means for adjustably securing a tillage gang, which is suspended from a tubular bar or sleeve, comprising a connector element slidably secured to the draw bar of the implement frame and carrying laterally-extending arms pivotally fixed to the connector, the arms being adapted to telescope with the sleeve for connecting the inner ends of the gangs, and means for pivotally securing the outer portion of the gangs to the corners of the frame.

These and other objects will become apparent from the following description when read in conjunction with the accompanying drawings, in which:

Figure 1 is a plan view of the implement of the invention;

Figure 2 is a sectional view taken along the line 2—2 of Figure 1; and

Figure 3 is a sectional view taken along the line 3—3 of Figure 1.

Figure 4 is a perspective view of the bolt for securing the connector element to the draw bar.

The main frame of the implement is generally rectangular in shape and comprises opposed side members 10 and 12 and opposed end members 14 and 16. A central longitudinally-extending draw bar, designated generally by the numeral 20, is secured as by welding to the cross members 14 and 16. An additional cross member 34, and other braces, may be provided between the side members to provide additional strength to the frame. Angular members 18 extend from the forward ends of members 10 and 12 and converge at the draw bar. The forward end member 16 of the frame is preferably spaced from the ends of the side members 10, 12 and secured to the angular members 18 to permit access for connecting and disconnecting the gangs. The draw bar is preferably made from two lengths of channel iron 22 and 24 disposed with their bottoms in vertical face-to-face relation. The channel faces are laterally spaced to provide a narrow slot 23 extending the length of the frame. The channels are held in spaced relation by welding to the frame cross members, as previously indicated. A plate 32 is welded to the forward ends of the angular members 18, and to the draw bar 20, to insure rigidity of the draw bar and to connect it securely to the frame. The portion of the draw bar extending beyond the plate 32 may be drawn together so that the space between the channel members comprising the draw bar gradually is reduced to zero. A suitable plate 28 is welded to the outer end of the draw bar for this purpose. Extending from the end of the draw bar is a bracket 30 which cooperates with the hitch on the tractor for pulling the implement.

The frame is adapted to ride on a pair of wheels 42 which are mounted on stubby axles 40 extending from the vertical arms 38. The arms 38 are fixed at their opposite ends to a shaft 36 rotatably journalled at either end in bearings (not shown) secured to the underside of the side frame members 10 and 12. A hydraulic cylinder and cooperating linkage (not shown) is provided to rotate the shaft 36, thus adjusting the height of the frame above the ground. This means for adjustably mounting the frame is conventional. It permits positive depth control of the tillage gangs while the implement is being used to cultivate the soil, and also permits the gangs to be lifted up completely from the ground when the implement is being towed across the field or down the road. It is desirable to employ pneumatic tires on the wheels 42 to provide a smooth riding vehicle.

The gangs indicated generally by the numeral 35 are mounted generally transversely of the frame in pairs, with their inner ends pivotally secured to the draw bar, and their outer ends extending beyond the sides of the frame. At a point intermediate the ends, each gang is pivotally secured to the side member of the frame. The gang frame consists of longitudinal angle members 55, which are held in spaced relation by means of cross members 54 at either end, and an intermediate cross member 59 welded thereto. Cross member 55 is positioned so that it lies beneath the side members 10 and 12 when the gang is assembled with the frame. More cross members may be used if desired. Extending downwardly from the longitudinal angle members 55, beneath the terminal cross members 54, is a pair of angular brackets 56, which merge with a horizontal support 57, to the underside of which a bearing 58 is fixed. The gang frame is constructed in like manner at the opposite end. An axle or shaft 60, extends lengthwise of the gang frame and is journalled in the bearings 58. A multiplicity of curved discs 62, commonly used in cultivators of this type, are mounted at regular intervals on the axle 60, between the ends thereof.

It will be understood that cultivator gangs, mulcher gangs, pulverizer gangs, rotary hoe gangs and the like, may be substituted for the disc gangs. Because of the novel means for securing the gang frame to the implement frame, the gang may be easily removed and replaced with other tools as desired.

For adjustably securing the inner end of each gang to the draw bar, I have provided a novel connector arrangement, which is best illustrated in Figure 2. The connector arrangement consists of a pair of longitudinal plates 70 and 72, which extend laterally across the draw bar, plate 72 being in contact with the top surface of the draw bar, and the plate 70 being in contact with the bottom surface of the draw bar. The plates are held in slidable contact with the surface of the draw bar by means of a vertically extending stud 74, which is welded at its lower end to the crossbar 82 to form a T, Figure 4. The stud 74 is threaded at its upper end to receive a nut 76, which may be welded to a suitable tube 75, having a handle 77, for manually setting the nut 76.

The crossbar 82, comprising part of the T shaped stud, is equal in length to the width of the plate 70 and has a pair of ears 80, one at either end thereof, which extend above the top surface of the lower plate 70 in assembled position. The ears are the same width as the space 23 between the channels 22 and 24, and slide in space 23. Thus, the crossbar with its integral ears serves to keep plates square with respect to the draw bar. Short studs, not shown, projecting from the plate 70, or other suitable means, may likewise be employed for this purpose. It will be noted that by means of this arrangement the plates 70 and 72 may be moved as a unit substantially the entire length of the draw bar and locked at any desired position by tightening the nut 74.

A pair of pins 78 extend through both plates 70 and 72, one on either side of the draw bar, and are welded, or otherwise secured at their upper ends to the top plate 72, for pivotally securing arms 66 to the draw bar. The arms 66 preferably are made of square bar stock. The lower ends of pins 78 slide through openings near the inner ends of the arms 66, which permits disassembling the connector element from the draw bar and the arms 66.

To prevent the arms 66 from moving vertically on the pins 78, a suitable sleeve or spacer 79, Figure 2, is provided between the upper plate 72 and the upper surface of the arm 66, to take up the difference in thickness between the arm and the draw bar. Thus, the arms 66 extend generally horizontally and laterally from the draw bar toward the side members of the implement frame.

The inner end of each gang frame carries a turbine bar or sleeve 50, welded to cross members 54 and 59, as best shown in Figure 3. The tubular bar 50 is square in cross section and of suitable dimensions to receive the arm 66 with little play. Thus, the inner end of each of the gangs may be slidably secured to the connector element by means of the arms 66 pivoted thereto. The arm 66 telescopes within the tubular bar 50 to provide lateral adjustment, regardless of the location of the connector element on the draw bar. It will be noted that in the forward pair of gangs the tubular bars 50 are slightly shorter than the distance between the draw bar and the side members 10, 12 of the frame. This permits the outer end of each forward gang to be pivotally secured to the side members of the frame in exactly the same manner as the inner ends are secured to the connector element. A bar or arm 67, which may be identical to arm 66, is pivotally fixed to the side members 10, 12 of the frame near the forward corners by means of a pin 61. The arm 67 is adapted to slide into the outer end of the tubular bar 50. Thus, the forward gangs "float" laterally with respect to the frame. Since the outer gang ends, which project beyond the sides of the implement frame, lead inner ends, the pressure of the soil being cultivated, forces the discs toward each other. Bumpers may be provided on the innermost discs to permit them to remain in contact at all times. Any shift, therefore, causes both forward gangs to move laterally together.

If desired, the outer end of the forward gangs may be secured to the side members of the frames by passing a pin directly through the cross member 59 of the gang frame. This, of course, will fix the gang so that it will not move laterally with respect to the frame.

A similar construction, utilizing the same principle, is illustrated in Figure 1 for securing the rear gangs to the implement frame. Due to the angle of the rear gangs with respect to the frame (the outer ends trail rather than lead) the soil tends to separate the pair. Consequently, the rear gangs are fixed with respect to the frame. Instead of providing a tubular bar or sleeve extending the entire distance between the connector element and the outer frame member, the gang is provided with a sleeve or tubular bar 84 welded to the cross members 54 and 57 at the inner end of the gang frame. The rod 66 is of suitable cross-sectional dimension so that it slides into the sleeve 84 to support the inner end of the gang. The connector element is identical in construction to the one used in securing the forward pair of gangs. The outer end of each of the rear pair of gangs is pivotally fixed to the implement frame by means of a bolt 86 which extends through a corner plate 88 welded to the frame, and an opening provided therefor in the central cross member 59 of the gang frame. The bolt 86 may extend through side frame members 10, 12, but the provision of the plates 88 makes for a more rigid construction. The gang is thus free to turn about the pivot point 86 to permit adjusting the angle of the gang with respect to the frame by moving the connector element longitudinally along the draw bar.

It will be seen that the above-described construction provides a novel and efficient way for securing tillage gangs to the implement frame. At the same time, the construction provides for any angular adjustment by merely sliding the connector element along the draw bar and then tightening the nut 76 to lock it in place.

Other modifications of my invention will become apparent to those skilled in the art from the foregoing description. It is, therefore, not my intention to limit the invention other than as necessitated by the scope of the appended claim.

What I claim as new and desire to secure by Letters Patent of the United States is:

In a ground tillage implement comprising a generally rectangular frame having opposed end and side members and a central longitudinally-extending draw bar, said draw bar consisting of two channel iron members spaced apart with their bottoms facing each other and their legs facing the opposed side members of the frame, and a pair of tillage gangs extending transversely of the frame with their inner ends opposed and adjustably secured to the draw bar, the improved means for securing the gangs to the implement frame which comprises a pair of opposed plates extending across the draw bar one on the top and the other on the bottom, a bolt extending through both plates and between said channel iron members for locking said plates to the draw bar at any point along its length, a pair of vertically disposed pins fixed to said plates on either side of the draw bar, a tubular bar of square cross section fixed to the top of each gang frame near the inner end thereof a pair of generally horizontal arms having their inner ends pivotally fixed to said plates by means of said pins and adapted to telescope with said tubular bar to permit varying the effective length of the bar upon movement of said plates along the draw bar, and means for pivotally securing the gang frames at a point intermediate the ends thereof to the implement frame near the corners thereof.

References Cited in the file of this patent

UNITED STATES PATENTS

| | | |
|---|---|---|
| 348,693 | Richards | Sept. 7, 1886 |
| 1,634,650 | Coon | July 5, 1927 |
| 1,729,061 | Bucknam | Sept. 24, 1929 |